US006988265B2

(12) United States Patent
Allison

(10) Patent No.: US 6,988,265 B2
(45) Date of Patent: Jan. 17, 2006

(54) METHOD AND APPARATUS FOR STATEMENT BOUNDARY DETECTION

(75) Inventor: David S. Allison, San Ramon, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 763 days.

(21) Appl. No.: 09/977,527

(22) Filed: Oct. 12, 2001

(65) Prior Publication Data

US 2003/0074651 A1    Apr. 17, 2003

(51) Int. Cl.
G06F 9/45    (2006.01)

(52) U.S. Cl. .................... 717/143; 717/141; 717/142

(58) Field of Classification Search ........ 717/110–119, 717/136–148, 141–143
See application file for complete search history.

(56) References Cited

U.S. PATENT DOCUMENTS

| | | | | | |
|---|---|---|---|---|---|
| 5,301,325 | A | * | 4/1994 | Benson ................. | 717/159 |
| 5,307,492 | A | * | 4/1994 | Benson ................. | 717/159 |
| 5,748,975 | A | * | 5/1998 | Van De Vanter ....... | 715/531 |
| 5,752,058 | A | * | 5/1998 | Van De Vanter ....... | 715/531 |
| 5,813,019 | A | * | 9/1998 | Van De Vanter ....... | 715/512 |
| 5,963,742 | A | * | 10/1999 | Williams ............... | 717/143 |
| 6,134,709 | A | * | 10/2000 | Pratt .................... | 717/143 |
| 6,275,978 | B1 | * | 8/2001 | Bell ..................... | 717/143 |
| 2002/0144246 | A1 | * | 10/2002 | Yu ....................... | 717/143 |

OTHER PUBLICATIONS

Aho et al., Compilers, Principles, Techniques and Tools, Addion-Wesley, 1986, p. 49-779.*
Hajdu et al., "Statement boundary flagging", Feb. 1975. IBM Technical Disclosure Bulletin: vol. 17, No. 9, pp. 2660-2661.*
Norcio et al., "Human Memory Organization for Computer Programs", Mar. 1983. Journal of the American Society for Information Science, New York: vol. 34, iss. 2; pp. 109-114.*
Wheeler, "Ada, C, C++, and Java vs. The Steelman", Jul./Aug. 1997. ACM SIGAda Ada Letters: vol. XVII, No. 4, pp. 88-112.*

* cited by examiner

Primary Examiner—Tuan Dam
Assistant Examiner—Matthew Dickeson
(74) Attorney, Agent, or Firm—Osha Liang LLP

(57) ABSTRACT

The present invention provides a method and apparatus for statement boundary detection. In one embodiment of the present invention, a parser determines a natural end of a statement, where possible, based upon the context of the input stream and the syntax of the programming language. Thus, no statement terminator is necessary when a natural end to a statement is determined. The parser uses the natural end of a statement to terminate one statement and begin parsing another statement. In one embodiment, a special statement termination token is required to terminate a statement when no natural statement end exists. In another embodiment, a special statement termination token can be used to terminate a statement when a natural end of the statement exists.

9 Claims, 6 Drawing Sheets

Figure 2

200
P -> S | WS | SW | SP | WSP

205
S -> A | A, | AW, | D | D, | DW,

210
A -> V=E | VW=E | V=WE | VW=WE

215
E -> N | V | NON | NWON | NOWN | NWOWN | VON | VWON | VOWN | VWOWN | NOV | NWOV | NOWV | NWOWV | VOV | VWOV | VOWV | VWOWV

220
O -> + | - | * | /

225
D -> TWV

230
T -> t | c

235
N -> DI | -DI

240
DI -> 0 | 0DI | 1 | 1DI | 2 | 2DI | 3 | 3DI | 4 | 4DI | 5 | 5DI | 6 | 6DI | 7 | 7DI | 8 | 8DI | 9 | 9DI

245
V -> NRL | LVES

250
NRL -> a | b | d | e | f | g | h | i | k | l | m | n | o | p | q | r | s | t | u | v | w | x | y | z

255
L -> a | b | c | d | e | f | g | h | i | j | k | l | m | n | o | p | q | r | s | t | u | v | w | x | y | z

260
VES -> N | NVES | L | LVES

265
W -> <space> | <space>W | <carriage return> | <carriage return>W

METHOD AND APPARATUS FOR STATEMENT BOUNDARY DETECTION

BACKGROUND OF THE INVENTION

1. Field of the Invention

The present invention relates to the field of computer code parsers, and in particular to a method and apparatus for statement boundary detection.

Sun, Sun Microsystems, the Sun logo, Solaris and all Java-based trademarks and logos are trademarks or registered trademarks of Sun Microsystems, Inc. in the United States and other countries. All SPARC trademarks are used under license and are trademarks of SPARC International, Inc. in the United States and other countries. Products bearing SPARC trademarks are based upon an architecture developed by Sun Microsystems, Inc.

2. Background Art

In programming languages, a program is divided into a series of statements, each of which typically execute sequentially. A language parser determines where one statement ends and another begins. Typically, a programmer must insert a special token at the end of the statement. Inserting a special token at the end of each statement is inefficient. This is better understood by a review of programming languages.

Programming Languages

Programming languages are used to express a set of detailed instructions for a digital computer. A programming language consists of characters and rules for combining them into symbols and words.

Many kinds of programming languages have been developed over the years. Initially programmers wrote instructions in machine language. This coded language, which can be understood and executed directly by the computer without conversion or translation, consists of binary digits representing operation codes and memory addresses. Because it is made up of strings of 1s and 0s, machine language is difficult for humans to understand or write. Assembly language was devised for greater convenience. It enabled programmers to express instructions in alphabetic symbols (e.g., AD for add and SUB for subtract) rather than in numbers.

Although assembly language with its mnemonic code was easier to use than machine language, it was clearly desirable to develop programming languages that more closely resembled human communication. The first so-called high-level language was FORTRAN (acronym for Formula Translation), invented in 1956. FORTRAN was well suited to scientists and mathematicians because it was similar to mathematical notations. It did, however, present some difficulty for those in nonmathematically oriented fields. As a result, a more practical programming language known as COBOL (Common Business-Oriented Language) was devised several years later (1960). COBOL employs words and syntax resembling those of ordinary English. Later, other languages even easier to learn and use were introduced. BASIC (Beginner's All-Purpose Symbolic Instruction Code), for example, can be readily mastered by the layperson and is used extensively in schools, businesses, and homes for microcomputer programming. C is a high-level language that can function as an assembly language; much commercial software is written in this flexible language. Another versatile language widely used for microcomputer as well as minicomputer applications is Pascal (probably named for the French scientist-philosopher Blaise Pascal).

Other high-level programming languages possess unique features that make each one suitable for a specific application. Some examples are APT (Automatically Programmed Tools), for numerical control of industrial machine tools, and GPSS (General-Purpose Simulation System), for constructing simulation models. LISP (List Processing) can be used to manipulate symbols and lists rather than numeric data; it is often used in artificial-intelligence applications. Fourth-generation languages (4GLs) are closer to human language than are high-level (or third-generation) languages. They are used primarily for database management or as query languages; examples include FOCUS, SQL (Structured Query Language), and dBASE. Object-oriented programming languages, such as C++ and Smalltalk, write programs incorporating self-contained collections of data structure or computational instructions (called "objects"). New programs can be written by reassembling and manipulating the objects.

Compiler

Typically, program source code is compiled before it can be executed. FIG. 1 illustrates a compiler which translates program source code into computer readable bytecode. The compiler 110 comprises a parser 101, a translator 103, and a code generator 105. The parser 101 receives input in the form of source code 100 and generates a high-level representation 102 of the program code. This high-level representation 102 may include, for example, a list of statements sorted by order of execution and a list of unique variable identifiers.

The translator 103 receives the high level representation 102 and translates the operations into a sequential representation (or intermediate form) 104 that describes the program operations. The sequential representation 104 is transformed by code generation process 105 into executable code 106 for a target simulation system. The code generator may implement one or more optimization techniques (e.g., changing the sequence of executed statements).

Statement Syntax

A program is divided into a series of statements, each of which typically execute sequentially. The structure of the statements is determined by the syntax of the programming language. When a program is compiled, first, a parser goes through the text of the source code to associate individual characters or strings of characters in the source code with structural parts of the programming language according to the syntax of the language.

For example, a parser for the C programming language would parse the string "x++; calc=x+y;" as follows: "x" is a variable, "++" is an increment operator, ";" indicates the end of a statement, ""is ignored, "calc" is a variable, ""is ignored, "x" is a variable, "+" is an addition operator, ""is ignored, "y" is a variable, and ";" indicates the end of a statement.

Statement Terminator Tokens

The parser must determine where one statement ends and the next statement begins in the input stream containing the source code for the program. This is traditionally accomplished by requiring the programmer to insert a special token at the end of each statement. For the C programming language, the statement end token is a ";". Other programming languages use difference tokens, including a line-feed or carriage return. In some programming languages (e.g., BASIC), the end of a statement is signified by either a carriage return or a special character between two statements on the same line.

SUMMARY OF THE INVENTION

The present invention provides a method and apparatus for statement boundary detection. In one embodiment of the present invention, a parser determines a natural end of a statement, where possible, based upon the context of the input stream and the syntax of the programming language. Thus, no statement terminator is necessary when a natural end to a statement is determined. The parser uses the natural end of a statement to terminate one statement and begin parsing another statement.

In one embodiment, a special statement termination token is required to terminate a statement when no natural statement end exists. In another embodiment, a special statement termination token can be used to terminate a statement when a natural end of the statement exists.

BRIEF DESCRIPTION OF THE DRAWINGS

These and other features, aspects and advantages of the present invention will become better understood with regard to the following description, appended claims and accompanying drawings where:

FIG. 2 is a block diagram of a partial syntax for a programming language in accordance with one embodiment of the present invention.

DETAILED DESCRIPTION OF THE INVENTION

Figure 1:
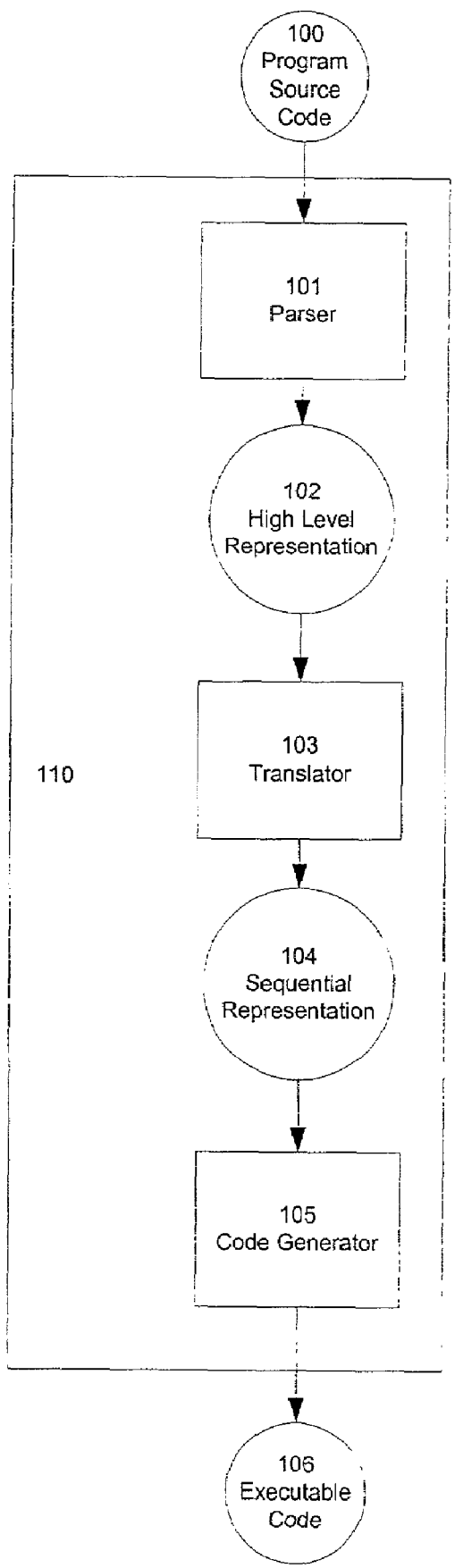
FIG. 1 is a block diagram of a compiler.

The invention is a method and apparatus for statement boundary detection. In the following description, numerous specific details are set forth to provide a more thorough description of embodiments of the invention. It is apparent, however, to one skilled in the art, that the invention may be practiced without these specific details. In other instances, well known features have not been described in detail so as not to obscure the invention.

Natural End of a Statement

In certain contexts, the syntax of a programming language will cause there to be a natural end of a statement in an input stream of source code. For example, FIG. 2 illustrates a partial syntax for a programming language.

Rule one 200 states that a program, P, is composed of the following:
- a statement, S;
- white space, W, followed by a statement, S;
- a statement, S, followed by white space, W;
- a statement, S, followed by a program, P;
- or white space, W, followed by a statement, S, followed by a program, P.

Rule two 205 states that a statement, S, is the following:
- an assignment, A;
- an assignment, A, followed by the statement terminator ";";
- an assignment, A, followed by a white space, W, followed by the statement terminator ";";
- a declaration, D;
- a declaration, D, followed by the statement terminator ";";
- or a declaration, D, followed by white space, W, followed by the statement terminator ";".

Rule three 210 states that an assignment, A, is the following:
- a variable, V, followed by an "=" followed by an expression, E;
- a variable, V, followed by white space, W, followed by an "=" followed by an expression, E;
- a variable, V, followed by an "=" followed by white space, W, followed by an expression, E;
- or a variable, V, followed by white space, W, followed by an "=" followed by white space, W, followed by an expression, E.

Rule four 215 states that an expression, E, is the following:
- a number, N;
- a variable, V;
- a number, N, followed by an operator, O, followed by a number, N;
- a number, N, followed by white space, W, followed by an operator, O, followed by a number, N;
- a number, N, followed by an operator, O, followed by white space, W, followed by a number, N;
- a number, N, followed by white space, W, followed by an operator, O, followed by white space, W, followed by a number, N;
- a variable, V, followed by an operator, O, followed by a number, N;
- a variable, V, followed by white space, W, followed by an operator, O, followed by a number, N;
- a variable, V, followed by an operator, O, followed by white space, W, followed by a number, N;
- a variable V, followed by white space, W, followed by an operator, O, followed by white space, W, followed by a number, N;
- a number, N, followed by an operator, O, followed by a variable, V; a number, N, followed by white space, W, followed by an operator, O, followed by a variable, V;
- a number, N, followed by an operator, O, followed by white space, W, followed by a variable, V;
- a number, N, followed by white space, W, followed by an operator, O, followed by white space, W, followed by a variable, V;
- a variable, V, followed by an operator, O, followed by a variable, V;
- a variable, V, followed by white space, W, followed by an operator, O, followed by a variable, V; a variable, V, followed by an operator, O, followed by white space, W, followed by a variable, V;
- or a variable, V, followed by white space, W, followed by an operator, O, followed by white space, W, followed by a variable, V.

Rule five 220 states that an operator, O, is a "+", "−", "*", or "/".

Rule six 225 states that a declaration, D, is a type, T, followed by white space, W, followed by a variable, V.

Rule seven 230 states that a type, T, is an integer, "i", or a character, "c".

Rule eight 235 states that a number, N, is a digit, DI, or a "−" followed by a digit, DI.

Rule nine 240 states that a digit, DI, is the following:
- "0";
- "0" followed by a digit, DI;

"1";
"1" followed by a digit, DI;
"2";
"2" followed by a digit, DI;
"3";
"3" followed by a digit, DI;
"4";
"4" followed by a digit, DI;
"5";
"5" followed by a digit, DI;
"6";
"6" followed by a digit, DI;
"7";
7" followed by a digit, DI;
8";
"8" followed by a digit, DI;
"9"; or "9" followed by a digit, DI.

Rule ten 245 states that a variable, V, is a non-reserved letter, NRL, or a letter, L, followed by a variable end string, VES.

Rule eleven 250 states that a non-reserved letter, NRL, is any letter other than "i" or "c".

Rule twelve 225 states that a letter, L, is any letter.

Rule thirteen 260 states that a variable end string, VES, is the following:
a number, N;
a number, N, followed by a variable end string, VES;
a letter, L;
or a letter, L, followed by a variable end string, VES.

Rule fourteen 265 states that white space, W, is the following:
a "";
a "" followed by white space, W;
a carriage return;
or a carriage return followed by a white space, W.

Using the rules of FIG. 2, the source code input stream of "i x i y x=y+1 y=2" contains three natural ends of statements. A ";" is unnecessary between the first "x" and the second "i" because the only way the beginning of the input stream fits the language syntax is if "i x" is the first statement. The statement is a declaration, with the type being integer and the variable being "x". Likewise, a ";" is unnecessary between the first "y" and the second "x" because the only way that portion of the input stream fits the language syntax is if "i y" is the second statement. The statement is a declaration, with the type being integer and the variable being "y".

Similarly, a ";" is unnecessary between the "1" and the third "y" because the only way that portion of the input stream fits the language syntax is if "x=y+1" is the first statement. The statement is an assignment, "x" as the first variable, white space, "=", white space, and "y+1" as the expression. The expression has "y" as the variable, white space, "+", white space, and "1" as the number.

Parsing Using Natural Ends of Statements

In one embodiment of the present invention, a parser determines a natural end of a statement, where possible, based upon the context of the input stream and the syntax of the programming language. Thus, no statement terminator is necessary when a natural end to a statement is determined. The parser uses the natural end of a statement to terminate one statement and begin parsing another statement.

Figure 3:
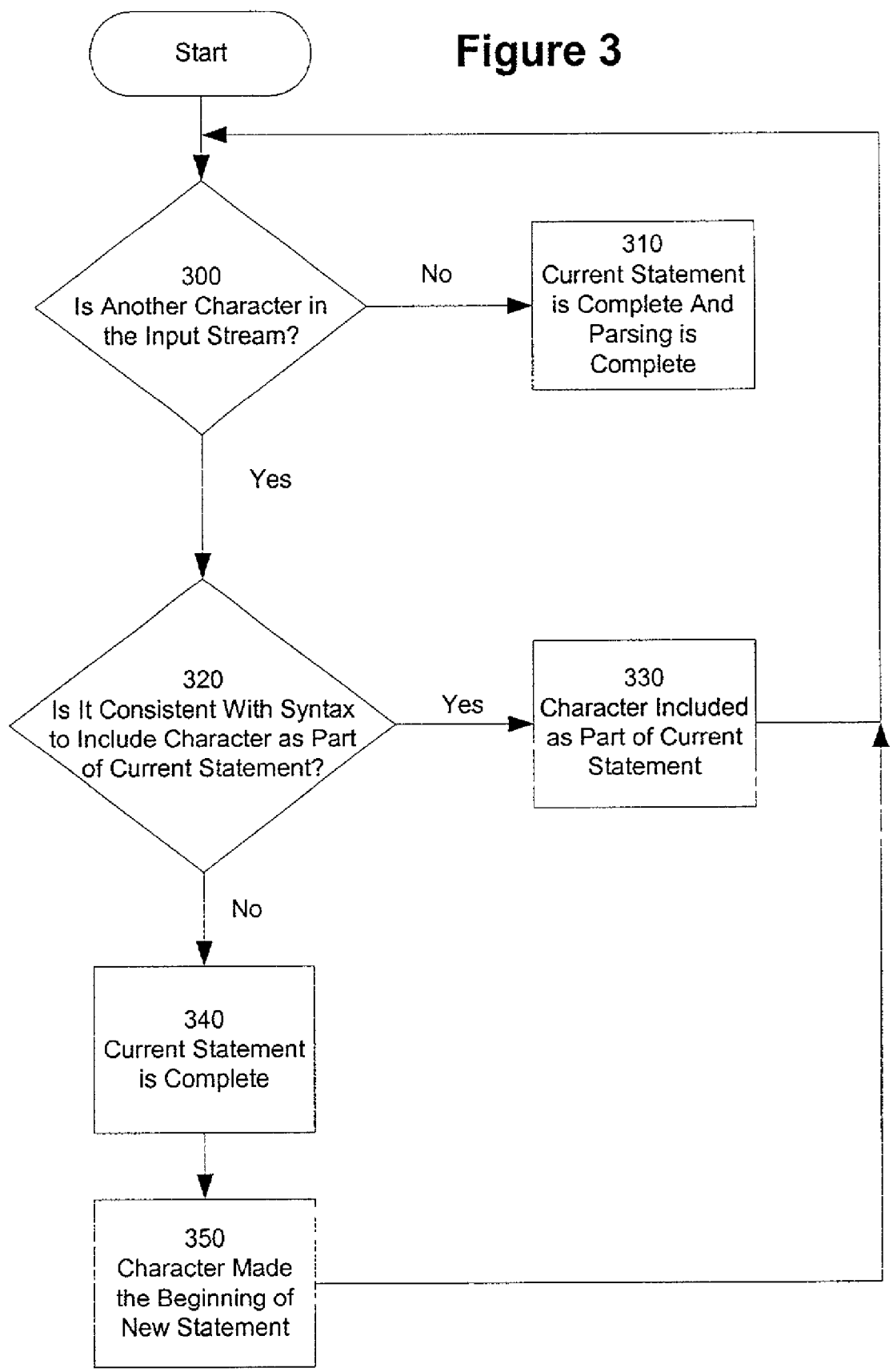
FIG. 3 is a flow diagram of the process of determining statement divisions in an input stream of source code in accordance with one embodiment of the present invention.

FIG. 3 illustrates the process of determining statement divisions in an input stream of source code in accordance with one embodiment of the present invention. At block 300, it is determined whether there is another character in the input stream. If there is no character in the input stream, at block 310, the current statement is complete and parsing is complete. If there is another character in the input stream, at block 320, the parser determines whether it is consistent with the syntax to include the character as part of the current statement.

If it is consistent with the syntax to include the character as part of the current statement, at block 330, the character is included as part of the current statement and the process continues at block 300. If it is not consistent with the syntax to include the character as part of the current statement, at block 340, the current statement is complete. At block 350, the character is made the beginning of a new statement and the process continues at block 300.

Figure 4:
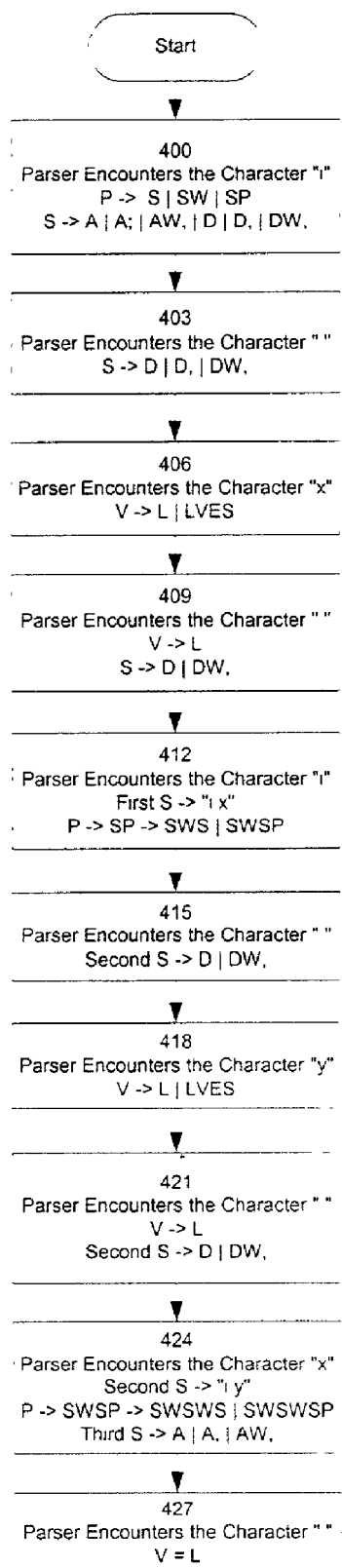
FIG. 4 is a flow diagram of the process followed in determining statement ends in accordance with one embodiment of the present invention using the syntax of FIG. 1 and the input stream of "i x i y x=y+1 y=2".
Figure 4:
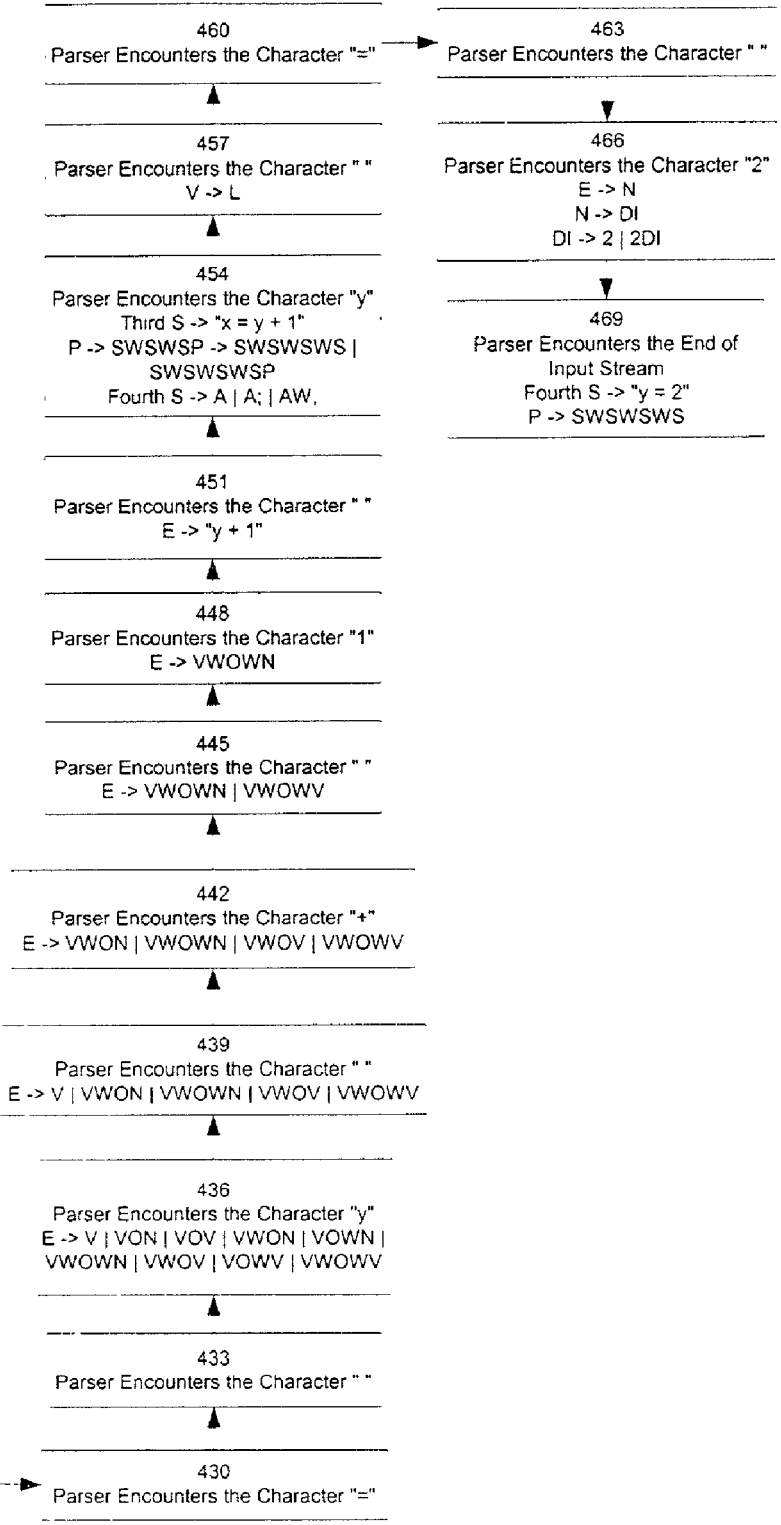

FIG. 4 illustrates the process followed in determining statement ends in accordance with one embodiment of the present invention using the syntax of FIG. 1 and the input stream of "i x i y x=y+1 y 2". At block 400, the parser encounters the character "i". At this point, the program could be of the form S, SW, or SP. The "i" could be the type in a declaration or it could be the beginning of a string that makes a variable. At block 403, the parser encounters the character "". At this point, the parser determines that the character "i" must be the type in a declaration. Thus, the next character must be either white space or the beginning of a variable.

At block 406, the parser encounters the character "x". The parser determines that this must be either the first letter of a string of characters that make up a variable or, since "x" is not a reserved letter, it could be the entire variable. At block 409, the parser encounters the character "". At this point, it is determined from the syntax that the "x" was the entire variable in the declaration statement. Additionally, the first statement is either of the form D or DW.

At block 412, the parser encounters the character "i". At this point, it is determined that "i x" is the first statement of the program. Also, the program is of the form SP. The P portion of the context expansion is either of the form WS or WSP, where W is the "" encountered at block 409. No special token is required for the parser to know where the natural end of the first statement is located.

The "i" could be the type in a declaration or it could be the beginning of a string that makes a variable. At block 415, the parser encounters the character "". At this point, the parser determines that the character "i" must be the type in a declaration. Thus, the next character must be either white space or the beginning of a variable.

At block 418, the parser encounters the character "y". The parser determines that this must be either the first letter of a string of characters that make up a variable or, since "y" is not a reserved letter, it could be the entire variable. At block 421, the parser encounters the character "". At this point, it is determined from the syntax that the "y" was the entire variable in the declaration statement. Additionally, the second statement is either of the form D or DW.

At block 424, the parser encounters the character "x". At this point, it is determined that "i y" is the second statement of the program. Also, the program is of the form SWSP. The P portion of the context expansion is either of the form WS or WSP, where W is the "" encountered at block 421. No special token is required for the parser to know where the natural end of the second statement is located. At this point, since "x" is neither "i" nor "c", it is determined that the next statement must be an assignment. Thus, "x" is either the entire variable or the beginning of a string that composes a variable. At block 427, the parser encounters the character "". Thus, at this point, it is determined that the "x" is the entire variable and the next character should be either white space or an "=". At block 430, the parser encounters the character "=". At block 433, the parser encounters the character "". At block 436, the parser encounters the character "y". At this point, the expression is of the form V, VON, VOV, VWON, VOWN, VWOWN, VWOV, VOWV, or VWOWV.

At block 439, the parser encounters the character "". Thus, the expression is of the form V, VWON, VWOWN, VWOV, or VWOWV. At block 442, the parser encounters the character "+". Now, the parser determines that the expression is not of the form V. At block 445, the parser encounters the character "". At this point, the parser determines that the expression is of the form VWOWN or VWOWV. At block 448, the parser encounters the character "1". At this point, the parser determines that the expression is of the form VWOWN. The "1" could be the entire number or the beginning of a string of numbers.

At block 451, the parser encounters the character "". Thus, the expression is "y+1". At this point, only white space or a ";" can be included as part of the third statement. At block 454, the parser encounters the character "y". Thus, at this point the parser determines that the third statement is "x=y+1". Also, the program is of the form SWSWSP. The P portion of the context expansion is either of the form WS or WSP, where W is the ""encountered at block 451. No special token is required for the parser to know where the natural end of the third statement is located.

At this point, since "y" is neither "i" nor "c", it is determined that the next statement must be an assignment. Thus, "y" is either the entire variable or the beginning of a string that composes a variable.

At block 457, the parser encounters the character "". Thus, at this point, it is determined that the "y" is the entire variable and the next character should be either white space or an "=". At block 460, the parser encounters the character "=". At block 463, the parser encounters the character "". At block 466, the parser encounters the character "2". At this point, the parser determines that the expression is of the form N. The "2" could be the entire number or it could be the beginning of a string of numbers that compose the number. At block 469, the parser encounters the end of the input stream. Thus, it is determined that the 2 is the entire number and that the last statement is "y=2". Also, the program is of the form SWSWSWS, where last W is the "" encountered at block 463. No special token is required for the parser to know where the natural end of the last statement is located.

In one embodiment, a special statement termination token is required to terminate a statement when no natural statement end exists. In another embodiment, a special statement termination token can be used to terminate a statement when a natural end of the statement exists. For example, in one programming language, a statement of the form "variable=variable variable=variable" is permissible in addition to statements of the form "variable=variable". Thus, the statement "x=y z=q" is ambiguous. The input string could be one statement, or the input string could be the statement "x=y" followed by the statement "z=q". Thus, there is no natural statement end if the programmer wishes the input stream to be two statements. In this instance, if the programmer wishes the input stream to be two statements, the programmer is required to use a statement terminator to make the statement end explicit. If the statement terminator is a ";", the correct input stream is "x=y; z=q".

Figure 5:
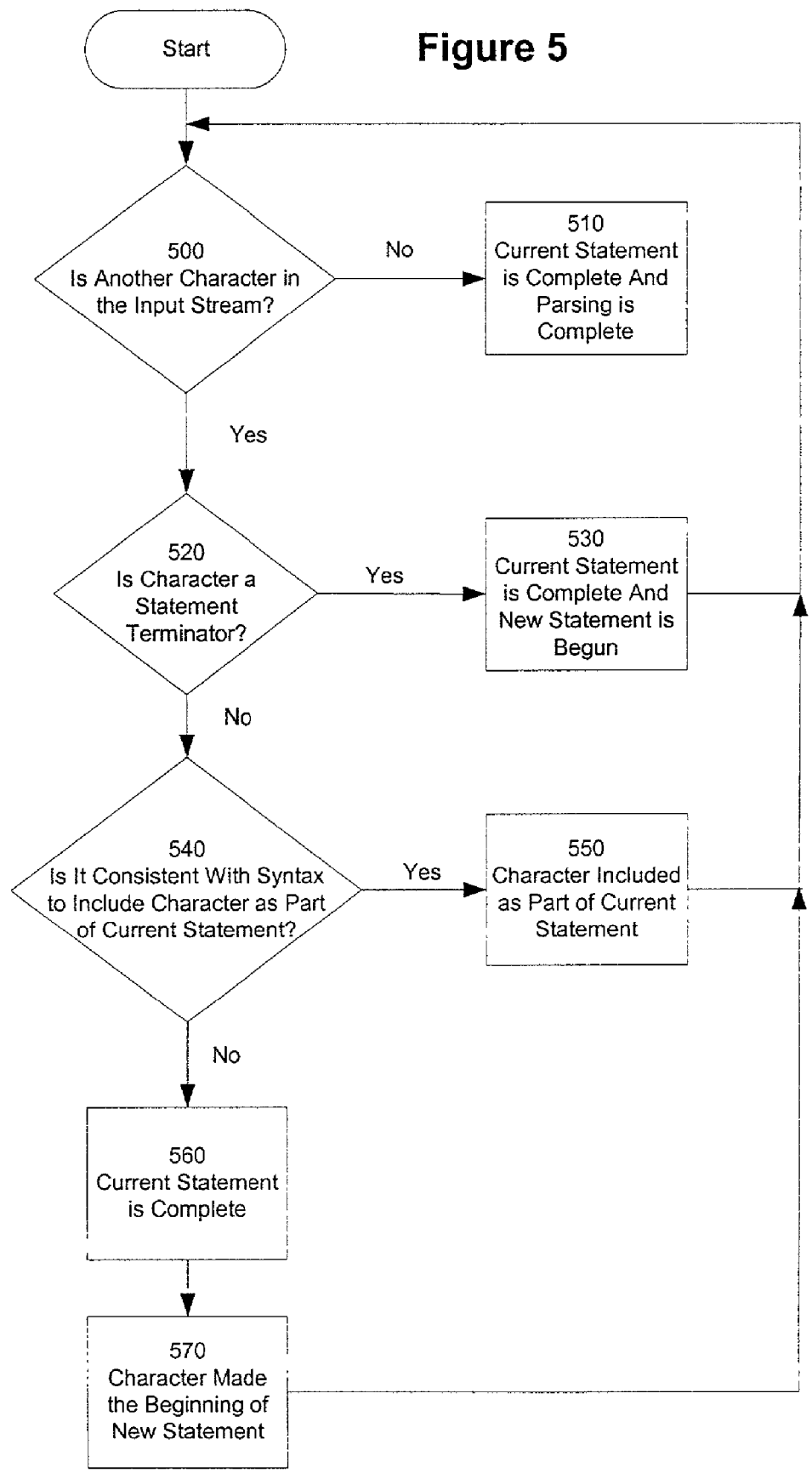
FIG. 5 is a flow diagram of the process of determining statement divisions in an input stream of source code in accordance with one embodiment of the present invention.

FIG. 5 illustrates the process of determining statement divisions in an input stream of source code in accordance with one embodiment of the present invention. At block 500, it is determined whether there is another character in the input stream. If there is no character in the input stream, at block 510, the current statement is complete and parsing is complete. If there is another character in the input stream, at block 520, the parser determines whether the character is a statement terminator. If the character is a statement terminator, at block 530, the current statement is complete, a new statement is begun and the process repeats at block 500.

If the character is not a statement terminator, at block 540, it is determined whether it is consistent with the syntax to include the character as part of the current statement. If it is consistent with the syntax to include the character as part of the current statement, at block 550, the character is included as part of the current statement and the process continues at block 500. If it is not consistent with the syntax to include the character as part of the current statement, at block 560, the current statement is complete. At block 570, the character is made the beginning of a new statement and the process continues at block 500.

In one embodiment, the parser uses knowledge gained during parsing in addition to syntactical information to determine natural statement ends. For example, in a language where every variable must be declared before it is used, statements of the form "variable=variable=variable" are allowed, statements of the form "variable=variable" are allowed and only the variables "x", "y" and "z" have been declared in the input stream encountered so far, the statement "x=yx=z" is not ambiguous. Since the parser knows that "yx" is not yet a declared variable, the input steam cannot be a single statement of the form "variable=variable=variable". Instead, the input stream must be the statement "x=y" followed by the statement "x=z".

Embodiment of Computer Execution Environment (Hardware)

Figure 6:
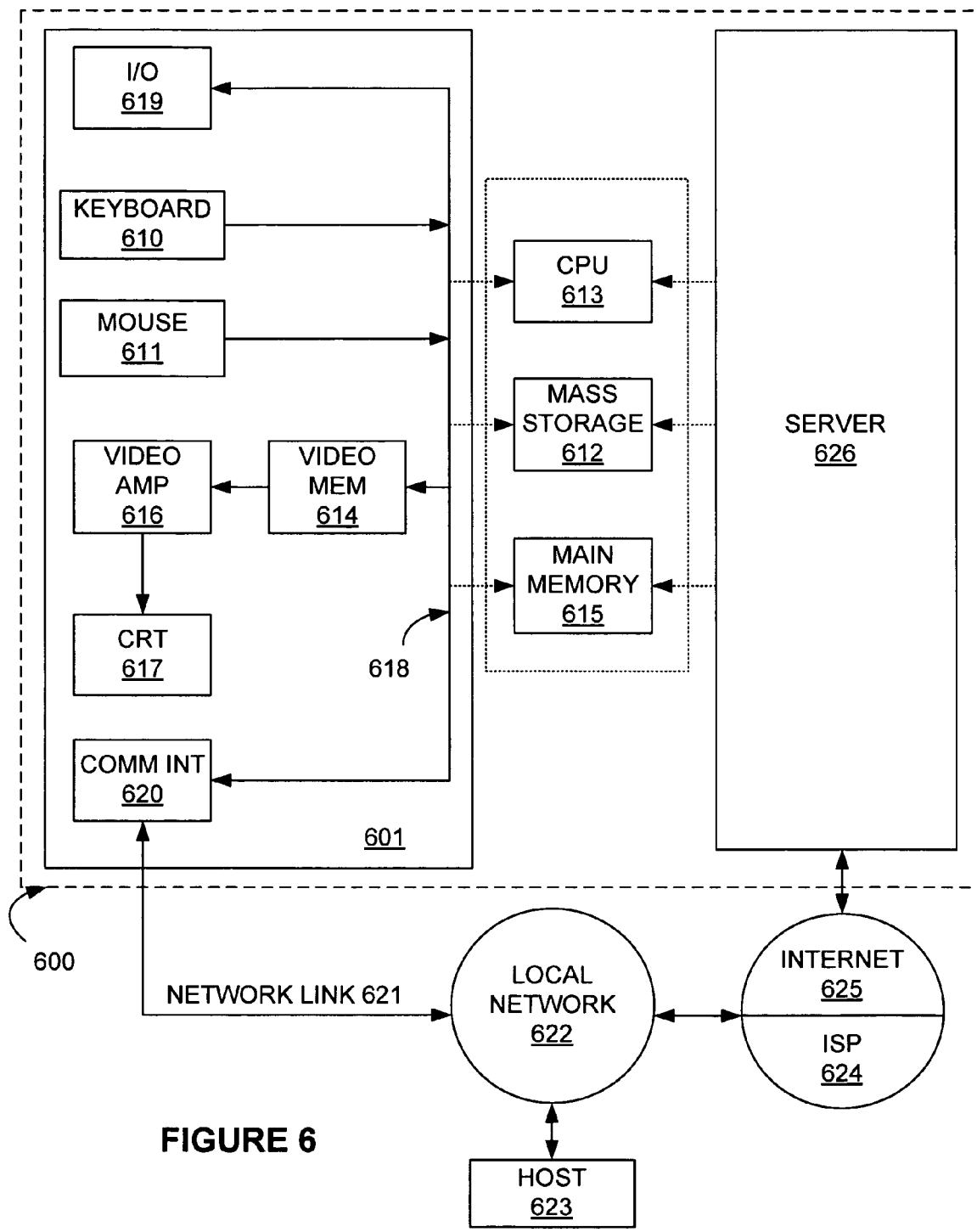
FIG. 6 is a block diagram of a general purpose computer.

An embodiment of the inventor can be implemented as computer software in the form of a computer readable program code executed in a general purpose computing environment such as environment 600 illustrated in FIG. 6, or in the form of bytecode class files executable within a Java™ run time environment running in such an environment, or in the form of bytecodes running on a processor (or devices enabled to process bytecodes) existing in a distributed environment (e.g., one or more processors on a network), or in the form of bytecodes running on a Personal Digital Assistant (PDA). A keyboard 610 and mouse 611 are coupled to a system bus 618. The keyboard and mouse are for introducing user input to the computer system and communicating that user input to central processing unit (CPU) 613. Other suitable input devices, a touch-sensitive display for example, may be used in addition to, or in place of, the mouse 611 and keyboard 610. I/O (input/output) unit 619 coupled to a bi-directional system bus 618 represents such 110 elements as a printer, A/V (audio/video) I/O, etc.

Computer 601 may include a communication interface 620 coupled to bus 618. Communication interface 620 provides a two-way data communication coupling via a network link 621 to a local network 622. For example, if communication interface 620 is an integrated services digital network (ISDN) card or a modem, communication interface 620 provides a data communication connection to the corresponding type of telephone line, which comprises part of network link 621. If communication interface 620 is a local area network (LAN) card, communication interface 620 provides a data communication connection via network link 621 to a compatible LAN. Wireless links are also possible. In any such implementation, communication interface 620 sends and receives electrical, electromagnetic or optical signals which carry digital data streams representing various types of information.

Network link 621 typically provides data communication through one or more networks to other data devices. For example, network link 621 may provide a connection through local network 622 to local server computer 623 or to data equipment operated by ISP 624. ISP 624 in turn provides data communication services through the world wide packet data communication network now commonly referred to as the "Internet" 625.

CPU 613 may reside wholly on client computer 601 or wholly on server 626 or CPU 613 may have its computational power distributed between computer 601 and server 626. Server 626 symbolically is represented in FIG. 6 as one unit, but server 626 can also be distributed between multiple "tiers". In one embodiment, server 626 comprises a middle and back tier where application logic executes in the middle tier and persistent data is obtained in the back tier. In the case where CPU 613 resides wholly on server 626, the results of the computations performed by CPU 613 are transmitted to computer 601 via Internet 625, Internet Service Provider (ISP) 624, local network 622 and communication interface 620. In this way, computer 601 is able to display the results of the computation to a user in the form of output.

Computer 601 includes a video memory 614, main memory 615 and mass storage 612, all coupled to bi-directional system bus 618 along with keyboard 610, mouse 611 and CPU 613. As with CPU 613, in various computing environments, main memory 615 and mass storage 612, can reside wholly on server 626 or computer 601, or they may be distributed between the two. Examples of systems where CPU 613, main memory 615, and mass storage 612 are distributed between computer 601 and server 626 include the thin-client computing architecture developed by Sun Microsystems, Inc., the Palm Pilot computing device and other personal digital assistants, Internet ready cellular phones and other Internet computing devices, and in platform independent computing environments, such as those which utilize the Java technologies also developed by Sun Microsystems, Inc.

The mass storage 612 may include both fixed and removable media, such as magnetic, optical or magnetic optical storage systems or any other available mass storage technology. Bus 618 may contain, for example, thirty-two address lines for addressing video memory 614 or main memory 615. The system bus 618 also includes, for example, a 32-bit data bus for transferring data between and among the components, such as CPU 613, main memory 615, video memory 614 and mass storage 612. Alternatively, multiplex data/address lines may be used instead of separate data and address lines.

In one embodiment of the invention, the CPU 613 is a SPARC microprocessor from Sun Microsystems, Inc., a microprocessor manufactured by Motorola, such as the 680×0 processor, a microprocessor manufactured for use in a PDA, or a microprocessor manufactured by Intel, such as the 80×86 or Pentium processor. However, any other suitable microprocessor or microcomputer may be utilized. Main memory 615 is comprised of dynamic random access memory (DRAM), and bytecodes for one embodiment of the invention is stored in a portion 627 of main memory 615 during program execution. Video memory 614 is a dual-ported video random access memory. One port of the video memory 614 is coupled to video amplifier 616. The video amplifier 616 is used to drive the cathode ray tube (CRT) raster monitor 617. Video amplifier 616 is well known in the art and may be implemented by any suitable apparatus. This circuitry converts pixel data stored in video memory 614 to a raster signal suitable for use by monitor 617. Monitor 617 is a type of monitor suitable for displaying graphic images.

Computer 601 can send messages and receive data, including program code, through the network(s), network link 621, and communication interface 620. In the Internet example, remote server computer 626 might transmit a requested code for an application program through Internet 625, ISP 624, local network 622 and communication interface 620. The received code may be executed by CPU 613 as it is received, and/or stored in mass storage 612, or other non-volatile storage for later execution. Alternatively, remote server computer 626 may execute applications using CPU 613, and utilize mass storage 612, and/or video memory 615. The results of the execution at server 626 are then transmitted through Internet 625, ISP 624, local network 622 and communication interface 620. In this example, computer 601 performs only input and output functions.

Application code may be embodied in any form of computer program product. A computer program product comprises a medium configured to store or transport computer readable code, or in which computer readable code may be embedded. Some examples of computer program products are CD-ROM disks, ROM cards, floppy disks, magnetic tapes, computer hard drives, and servers on a network.

The computer systems described above are for purposes of example only. An embodiment of the invention may be implemented in any type of computer system or programming or processing environment.

Thus, a method and apparatus for statement boundary detection is described in conjunction with one or more specific embodiments. The invention is defined by the following claims and their full scope and equivalents.

What is claimed is:

1. A method for statement boundary detection comprising:
obtaining an input stream;
parsing said input stream to determine a natural end of a first statement using a programming language syntax, wherein using said programming language syntax comprises recognizing said natural end of said first statement with and without said first statement having an explicit statement terminator, and wherein said parsing comprises:
retrieving a next character from said input stream; and
positioning said natural end of said first statement immediately before said next character, if appending said next character to said first statement is inconsistent with said programming language syntax;
dividing said input stream into a series of statements wherein said natural end is used to divide said first statement from a second statement; and
compiling said series of statements to create executable code for execution on a processor of a computer system.

2. The method of claim 1 wherein said parsing comprises:
determining a context from one or more characters previously retrieved from said input stream; and
positioning said natural end based on said context and said programming language syntax.

3. The method of claim 1 further comprising:
detecting a statement termination token.

4. A statement boundary detector system comprising:
a processor;
main memory; and instructions stored in main memory for executing on said processor to:

obtain an input stream;

parse said input stream to determine a natural end of a first statement using a programming language syntax, wherein using said programming language syntax comprises recognizing said natural end of said first statement with and without said first statement having an explicit statement terminator, and wherein parsing said input stream comprises:

retrieving a next character from said input stream; and positioning said natural end of said first statement immediately before said next character, if appending said next character to said first statement is inconsistent with said programming language syntax;

divide said input stream into a series of statements wherein said natural end is used to divide said first statement from a second statement; and compile said series of statements into executable code.

5. The statement boundary detector system of claim 4 further comprising instructions stored in main memory for executing on said processor to:

determine a context from one or more characters previously retrieved from said input stream; and position said natural end based on said context and said programming language syntax.

6. The statement boundary detector system of claim 4 further comprising instructions stored in main memory for executing on said processor to:

detect a statement termination token.

7. A computer program product comprising:

a computer usable medium having computer readable code embodied therein configured to detect a statement boundary, said computer program product comprising:

computer readable code configured to cause a computer to obtain an input stream;

computer readable code configured to cause a computer to parse said input stream to determine a natural end of a first statement using a programming language syntax, wherein using said programming language syntax comprises recognizing said natural end of said first statement with and without said first statement having an explicit statement terminator, and wherein said computer readable code configured to cause a computer to parse comprises:

computer readable code configured to cause a computer to retrieve a next character from said input stream; and computer readable code configured to cause a computer to position said natural end of said first statement immediately before said next character, if appending said next character to said first statement is inconsistent with said programming language syntax; and computer readable code configured to cause a computer to divide said input stream into a series of statements wherein said natural end is used to divide said first statement from a second statement.

8. The computer program product of claim 7 wherein said computer readable code configured to cause a computer to parse comprises:

computer readable code configured to cause a computer to determine a context from one or more characters previously retrieved from said input stream; and computer readable code configured to cause a computer to position said natural end based on said context and said programming language syntax.

9. The computer program product of claim 7 further comprising:

computer readable code configured to cause a computer to detect a statement termination token.

* * * * *